US009031431B2

(12) United States Patent
Shoji

(10) Patent No.: US 9,031,431 B2
(45) Date of Patent: May 12, 2015

(54) IMAGE FORMING APPARATUS WITH SPECTRAL DATA DETECTION UNIT

(75) Inventor: Ryuhei Shoji, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 13/492,600

(22) Filed: Jun. 8, 2012

(65) Prior Publication Data

US 2012/0328312 A1 Dec. 27, 2012

(30) Foreign Application Priority Data

Jun. 23, 2011 (JP) ................................ 2011-139857

(51) Int. Cl.
*G03G 15/00* (2006.01)
*G01J 3/46* (2006.01)

(52) U.S. Cl.
CPC .................................. *G03G 15/5062* (2013.01)

(58) Field of Classification Search
USPC ................................................ 399/49, 39, 41
See application file for complete search history.

(56) References Cited

U.S. PATENT DOCUMENTS

| | | | | |
|---|---|---|---|---|
| 7,111,784 | B2 | 9/2006 | Nakayama | 235/462.04 |
| 2006/0222419 | A1 * | 10/2006 | Ishibashi et al. | 399/301 |
| 2009/0021735 | A1 * | 1/2009 | Oldham et al. | 356/344 |

FOREIGN PATENT DOCUMENTS

| | | | |
|---|---|---|---|
| JP | 2004-245931 | | 9/2004 |
| JP | 2006308812 A | * | 11/2006 |

OTHER PUBLICATIONS

Machine translation of Kawaguchi, JP 2006-308812.*

* cited by examiner

*Primary Examiner* — David Gray
*Assistant Examiner* — Sevan A Aydin
(74) *Attorney, Agent, or Firm* — Fitzpatrick, Cella, Harper & Scinto

(57) ABSTRACT

An apparatus includes a unit configured to judge a border between two patch images among a plurality of patch images formed on the recording material, based on change in the amount of the light beam of at least one noticed wavelength detected by a detection unit; a unit configured to calculate a color value of a patch image from the amount of the light beam of each wavelength detected by the detection unit; and a control unit configured to control an accumulation period of charge for the photoelectric conversion at the detection unit. The control unit is further configured to make the accumulation period of the detection unit shorter when judging the border between the two patch images than when calculating the color value of each of the two patch images.

13 Claims, 16 Drawing Sheets

FIG. 10

| | ITEM | UNIT | PRIOR ART | PRESENT EMBODIMENT |
|---|---|---|---|---|
| 1 | SPEED OF CONVEYING TRANSFER MATERIAL | mm/s | 200 | 200 |
| 2 | SIZE OF TRANSFER MATERIAL IN DIRECTION OF CONVEYANCE (A4 LENGTHWISE) | mm | 297 | 297 |
| 3 | TOP MARGIN OF TRANSFER MATERIAL | mm | 5 | 5 |
| 4 | BOTTOM MARGIN OF TRANSFER MATERIAL | mm | 5 | 5 |
| 5 | TOLERANCE ON EXPANSION AND CONTRACTION OF IMAGE ON TRANSFER MATERIAL | ± % | 0.5 | 0.5 |
| 6 | NUMBER OF TIMES DETECTION IS PERFORMED FOR ONE PATCH IMAGE | TIMES | 4 | 4 |
| 7 | COLORIMETRY ACCUMULATION PERIOD FOR PATCH IMAGE WITH HIGH REFLECTANCE | ms | 1.5 | 1.5 |
| 8 | COLORIMETRY ACCUMULATION PERIOD FOR PATCH IMAGE WITH LOW REFLECTANCE | ms | 15 | 15 |
| 9 | BORDER JUDGMENT ACCUMULATION PERIOD FOR PATCH IMAGE WITH HIGH REFLECTANCE | ms | | 0.75 |
| 10 | BORDER JUDGMENT ACCUMULATION PERIOD FOR PATCH IMAGE WITH LOW REFLECTANCE | ms | | 0.75 |
| 11 | TIME PERIOD FOR READING SPECTRAL DATA FROM PATCH IMAGE AT ONE TIME | ms | 1.00 | 1.00 |
| 12 | RANGE NECESSARY FOR ACQUIRING DATA OF PATCH WITH HIGH REFLECTANCE WHEN ACQUIRING COLOR VALUE (DETECTION PERFORMED FOUR TIMES) | mm | 2.00 | 2.00 |
| 13 | RANGE NECESSARY FOR ACQUIRING DATA OF PATCH WITH LOW REFLECTANCE WHEN ACQUIRING COLOR VALUE (DETECTION PERFORMED FOUR TIMES) | mm | 12.80 | 12.80 |
| 14 | TOP MARGIN (BETWEEN PATCH WITH HIGH REFLECTANCE AND NEXT PATCH) | mm | 1.485 | 0.700 |
| 15 | BOTTOM MARGIN (BETWEEN PATCH WITH HIGH REFLECTANCE AND NEXT PATCH) | mm | 1.485 | 0.700 |
| 16 | TOP MARGIN (BETWEEN PATCH WITH LOW REFLECTANCE AND NEXT PATCH) | mm | 1.485 | 0.700 |
| 17 | BOTTOM MARGIN (BETWEEN PATCH WITH LOW REFLECTANCE AND NEXT PATCH) | mm | 1.485 | 0.700 |
| 18 | NUMBER OF PATCH IMAGES WITH HIGH REFLECTANCE | PIECES | 50 | 50 |
| 19 | NUMBER OF PATCH IMAGES WITH LOW REFLECTANCE | PIECES | 8 | 8 |
| 20 | LENGTH REQUIRED TO FORM ALL PATCH IMAGES | mm | 374.66 | 283.6 |
| 21 | LENGTH OF TRANSFER MATERIAL REQUIRED TO FORM ALL PATCH IMAGES | mm | 384.66 | 293.6 |

IMAGE FORMING APPARATUS WITH SPECTRAL DATA DETECTION UNIT

BACKGROUND OF THE INVENTION

1. Field of the Invention

The present invention relates to control on acquisition of color value information in an image forming apparatus that performs color balance correction based on color value information of an image formed on a recording material.

2. Description of the Related Art

There is demand for improvements in the image quality of images output from color image forming apparatuses such as color printers and color photocopiers. The tone of the density of the output images and the stability thereof are important elements that determine the image quality. Hence, the color image forming apparatuses need to suppress fluctuations in the density caused by environmental changes and prolonged use.

In view of this, Japanese Patent Laid-Open No. 2004-245931 discloses a configuration in which, after forming toner images for color correction using toner of each color (hereinafter referred to as "patch images") on a recording material, color values of the patch images formed on the recording material are detected so as to correct color values of toner images. In Japanese Patent Laid-Open No. 2004-245931, detection of a color value of each patch image for color correction is started based on a time period that has elapsed since detection of a reference patch image. This is described more specifically below with reference to FIG. 16.

As shown in FIG. 16, following a reference patch image 12*a* that can be acknowledged without fail, a plurality of patch images 10*a*, 10*b* and 10*c* for color correction are formed on a recording material. Note that in FIG. 16, the patch images 10*a* and 10*c* have high reflectance, whereas the patch image 10*b* has low reflectance. In FIG. 16, each of T10*a*, T10*b* and T10*c* represents a time period from when the start of the reference patch image 12*a* is detected, to when the acquisition of color value information of the corresponding patch image 10*a*, 10*b* or 10*c* is started. Note that each of Ma1, Mb1 and Mc1 represents a top margin section starting from the top edge of the corresponding patch image 10*a*, 10*b* or 10*c*, and ending when the acquisition of color value information is started. Similarly, each of M0, Ma2, Mb2 and Mc2 represents a bottom margin section.

FIG. 16 depicts a case where the color value information is acquired four times from each patch image. Note that in FIG. 16, Sa1-Sa4, Sb1-Sb4, and Sc1-Sc4 represent sections in which four pieces of color value information are acquired from the patch images 10*a*, 10*b* and 10*c*, respectively. It should be noted that the length of each section in which the color value information is acquired is determined in accordance with the reflectance. Here, the color value information is acquired multiple times for the purpose of correcting variations therein.

When using the method described above with reference to FIG. 16, the length of patch images in a conveyance direction of the recording material should be determined while taking the following factors into consideration: variations in the outer diameters of conveyance rollers that convey the recording material; fluctuations in the speed of conveying the recording material caused by environmental changes; influence of contraction of the recording material occurring when the recording material passes a fixing unit; and influence of expansion and contraction of an image occurring before the image is formed on the recording material. That is to say, the length of patch images should be determined while taking into consideration the top and bottom margins such that color value information can be acquired from each patch image without fail, even if the above-listed variations and fluctuations occur.

In order to correct the image quality to a high degree of precision so as not to make the user realize fluctuations in the density and color, it is necessary to detect a large number of color values by using a wide variety of patch images with different densities and colors. However, an increase in the number of patch images causes an increase in the sum of the lengths of the margin sections. This results in an increase in the size of a recording material required for forming the patch images, or an increase in the number of recording materials required therefore.

SUMMARY OF THE INVENTION

The present invention provides an image forming apparatus that can form patch images used for color correction in smaller sizes while maintaining favorable detection accuracy.

According to an aspect of the present invention, there is provided an image forming apparatus includes a storage unit configured to store data of a plurality of patch images; an image forming unit configured to form, on a recording material, the plurality of patch images whose data is stored in the storage unit; a spectral data detection unit configured to irradiate the recording material with light, photoelectrically convert light beams of different wavelengths included in the reflected light, and detect an amount of the light beam of each wavelength; a border judgment unit configured to judge a border between two patch images adjacent to each other among the plurality of patch images formed on the recording material, based on change in the amount of the light beam of at least one noticed wavelength detected by the spectral data detection unit; a color value calculation unit configured to calculate a color value of a patch image from the amount of the light beam of each wavelength detected by the spectral data detection unit irradiating the patch image with the light; and a control unit configured to control an accumulation period of charge for the photoelectric conversion at the spectral data detection unit, wherein the control unit is further configured to make the accumulation period of the spectral data detection unit shorter when judging the border between the two patch images adjacent to each other than when calculating the color value of each of the two patch images.

Further features of the present invention will become apparent from the following description of exemplary embodiments with reference to the attached drawings.

BRIEF DESCRIPTION OF THE DRAWINGS

FIG. 10 shows the effects of one embodiment;

DESCRIPTION OF THE EMBODIMENTS

A detailed description is now given of embodiments of the present invention with reference to the drawings.

(First Embodiment)

Figure 1:
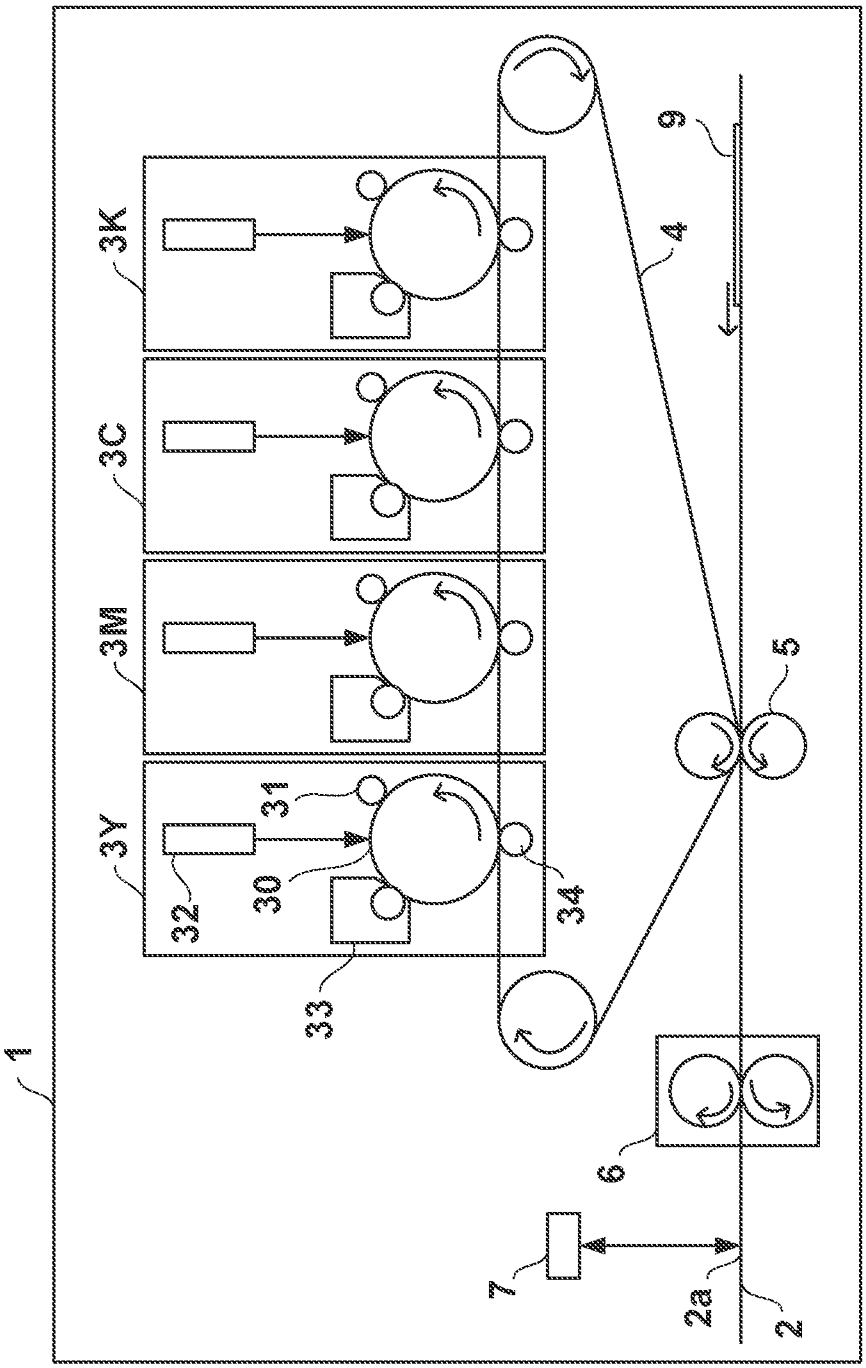
FIG. 1 is a block diagram showing an image forming unit in an image forming apparatus according to one embodiment.

First, an image forming unit 1 in an image forming apparatus according to First Embodiment of the present invention will be described with reference to FIG. 1. A member 3Y for forming a yellow toner image includes a charge unit 31 that charges the surface of a photoreceptor 30, and an exposure unit 32 that forms an electrostatic latent image by exposing the charged surface of the photoreceptor 30 to light. The member 3Y also includes a developer unit 33 that develops the surface of the photoreceptor 30 on which the electrostatic latent image is formed by using toner, and a first transfer member 34 that transfers the toner image on the photoreceptor 30 to an intermediate transfer body 4. Note that members 3M, 3C and 3K respectively form magenta, cyan and black toner images. As the members 3M, 3C and 3K are configured similar to the member 3Y, a description thereof is omitted.

The toner image transferred to the intermediate transfer body 4 is further transferred by a second transfer member 5 to a recording material 9 conveyed along a conveyance path 2. The toner image transferred to the recording material 9 is fixed by a fixing unit 6. The image forming unit 1 includes a color sensor 7 (spectral data detection unit) that detects, at a detection position 2*a* on the conveyance path 2, the amount of light at each wavelength reflected by a fixed patch image formed on the recording material 9.

Figure 2:
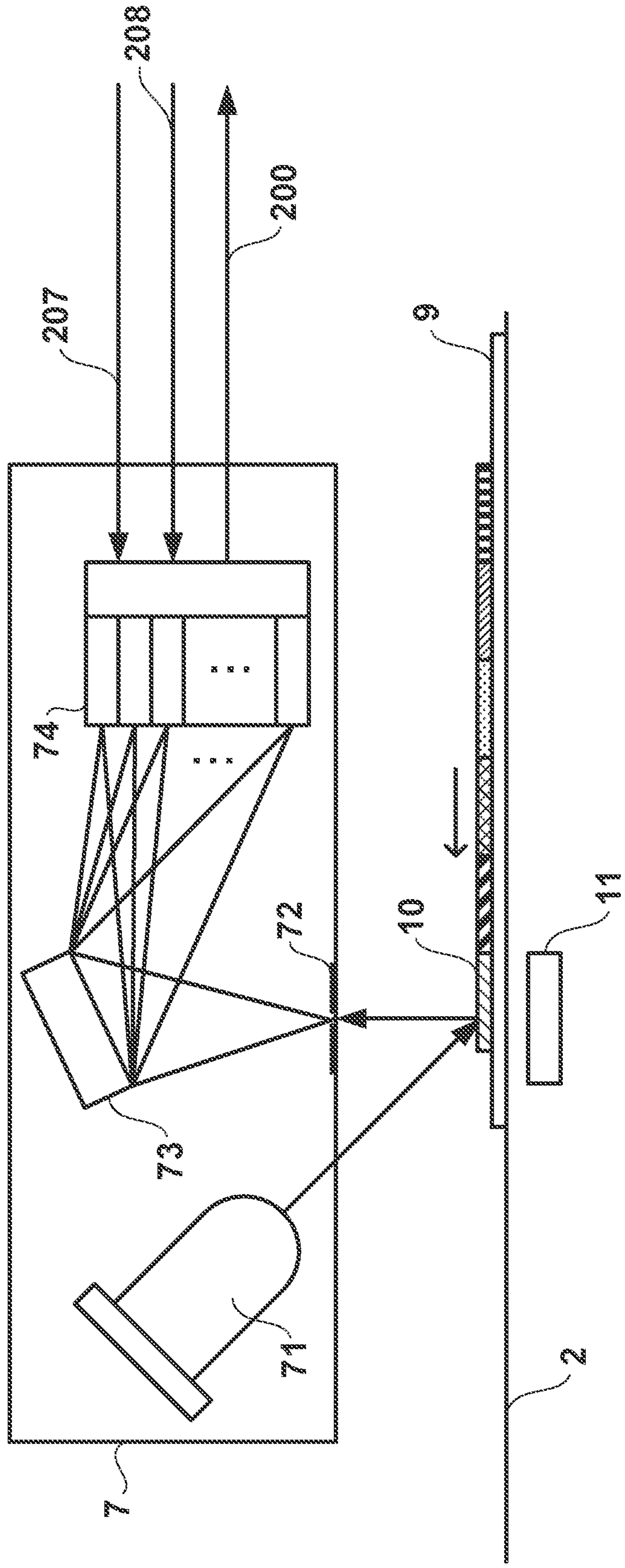
FIG. 2 is a block diagram showing a color sensor according to one embodiment.

The color sensor 7 is a spectral color sensor capable of measuring the amount of light at a plurality of (e.g. 100 or more) wavelengths. For instance, as shown in FIG. 2, a white light-emitting diode (LED) 71 in the color sensor 7 irradiates a fixed patch image 10 with light. The light that has reflected off the patch image is incident on a slit 72 at 90 degrees with respect to the surface of the recording material 9 and passes through the slit 72. The light that has reflected off the patch image and passed through the slit 72 is dispersed by a diffraction grating 73 into light beams of different wavelengths. A line sensor 74 having a plurality of light-receiving units is a charge storage type, and photoelectrically converts the light beams of different wavelengths dispersed by the diffraction grating 73, and detects the amount of each light beam.

Figure 3:
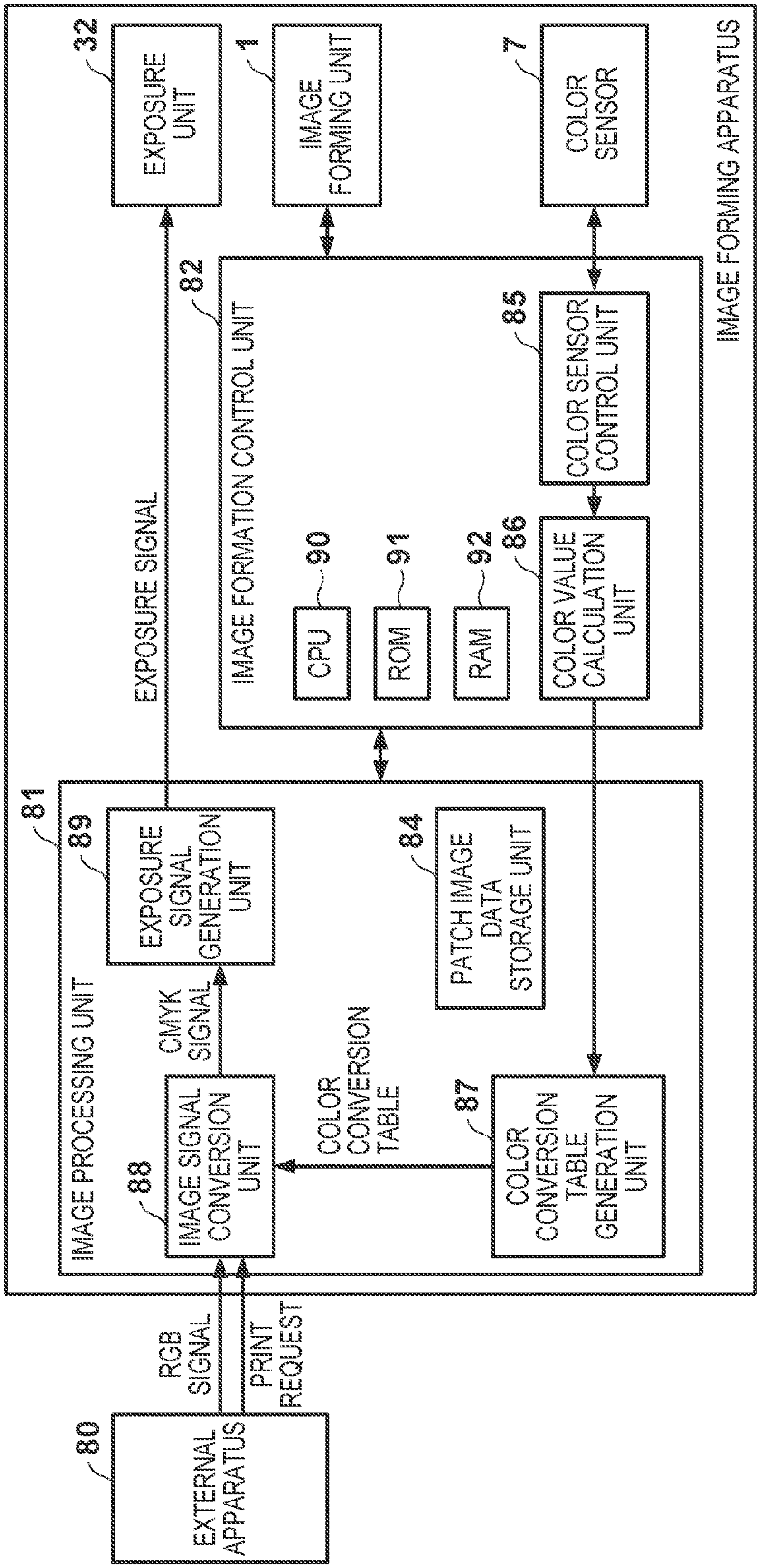
FIG. 3 is a block diagram showing an image forming apparatus according to one embodiment.

A color sensor control unit 85 shown in FIG. 3 inputs an accumulation instruction signal 207, which indicates a accumulation period for each reflected and received light beam, to the color sensor 7. The line sensor 74 also outputs the acquired amounts of the light beams of different wavelengths, namely spectral data 200, in response to a read instruction signal 208 input from the color sensor control unit 85. Although not illustrated, the color sensor 7 is provided with a reset input unit for initialization and an input unit for a clock signal that controls timings for reading the spectral data and the like. Furthermore, as shown in FIG. 2, a white reference plate 11 is provided so as to face the color sensor 7 via the detection position.

The following describes operations of the image forming apparatus according to the present embodiment with reference to FIG. 3. The image forming apparatus receives an image signal (RGB signal) and a print request from an external apparatus 80 such as a personal computer. An image signal conversion unit 88 in an image processing unit 81 converts the received RGB signal into a CMYK signal, corrects the tone and density based on a color conversion table stored therein, and outputs the corrected CMYK signal. Note that the color conversion table for correcting the tone and density is generated and updated by a color conversion table generation unit 87. Based on the CMYK signal with corrected tone and density, an exposure signal generation unit 89 generates an exposure signal for exposure by the exposure unit 32. Although not illustrated, the image processing unit 81 includes a central processing unit (CPU) for controlling the image processing unit 81, a read-only memory (ROM) storing execution programs for the CPU, and a random-access memory (RAM) storing control data and the like.

A central processing unit (CPU) 90 in an image formation control unit 82 controls the entire image forming unit 1. In the image formation control unit 82, a read-only memory (ROM) 91 stores programs executed by the CPU 90, and a random-access memory (RAM) 92 stores various types of data when the CPU 90 performs control processing. As has been mentioned above with reference to FIG. 2, the color sensor control unit 85 acquires spectral data from the color sensor 7 by controlling the color sensor 7.

When it is judged that processing for updating or generating the color conversion table needs to be performed, the image formation control unit 82 controls the image forming unit 1 to form and fix patch images stored in a patch image data storage unit 84 on the recording material 9. Thereafter, the color sensor control unit 85 repeatedly acquires, from the color sensor 7, spectral data used to calculate color values of patch images and spectral data used to judge a border between two patch images adjacent to each other. A color value calculation unit 86 converts spectral data for calculating color values into color values. The color conversion table generation unit 87 calculates differences between color values of the formed patch images stored in the patch image data storage unit 84 and the color values calculated by the color value calculation unit 86, and generates or updates the color conversion table based on the calculated differences. In this way, changes in color caused by environmental factors affecting the image forming apparatus can be corrected when generating image data.

Figure 4:
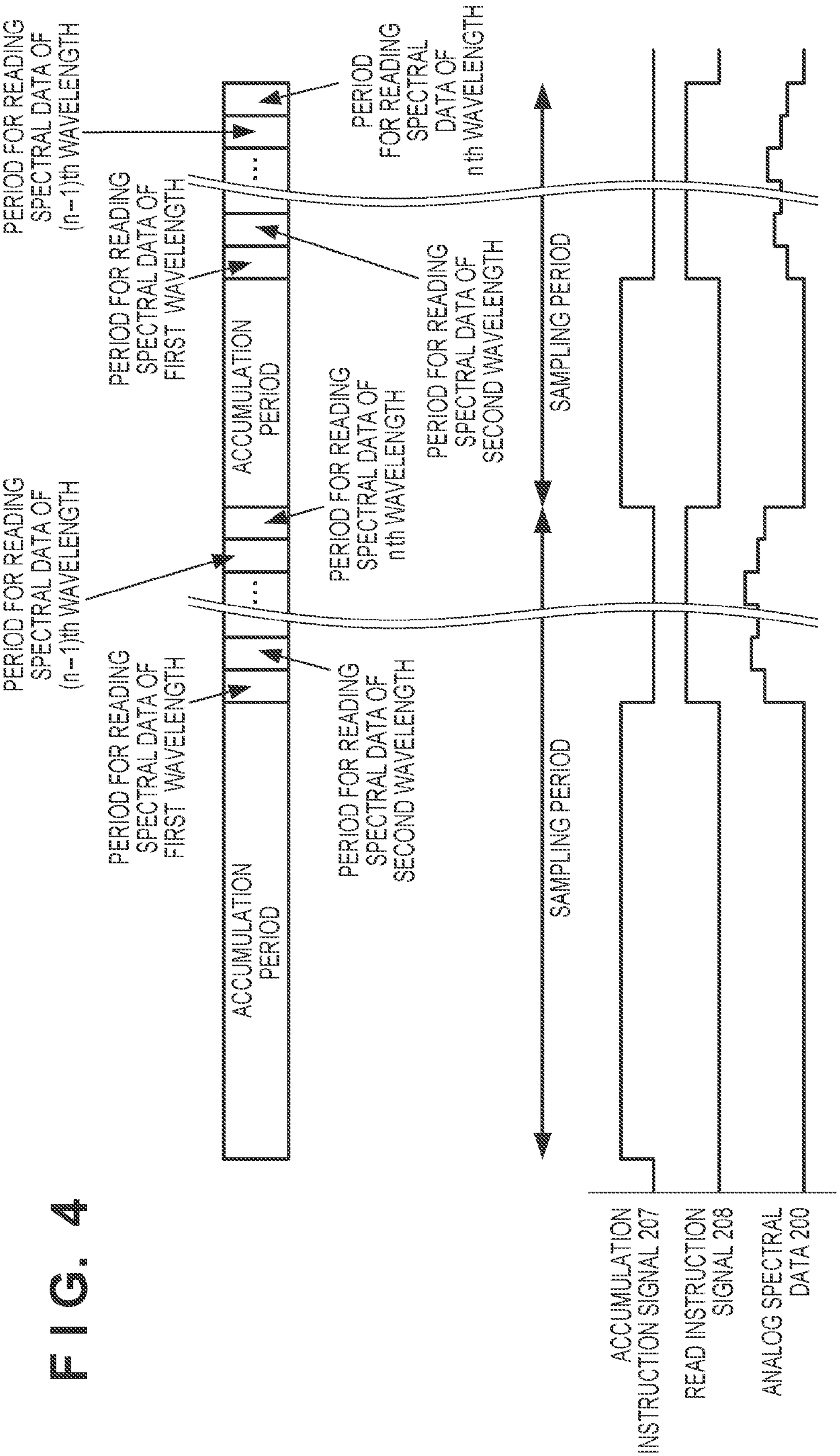
FIG. 4 is a timing chart illustrating control on a color sensor according to one embodiment.

A description is now given of timings for acquiring spectral data with reference to FIG. 4. Note, the following description is given under the assumption that the color sensor 7 has n light-receiving elements (n is a natural number). The color sensor 7 accumulates light beams while the accumulation instruction signal 207 is at a high level. Once the read instruction signal 208 reaches a high level, the color sensor 7 outputs the amounts of light beams of different wavelengths, namely spectral data, in sequence. A time period required to read all the spectral data, i.e. one sampling period, spans between the start of accumulation of light beams and the end of output of spectral data of the $n^{th}$ wavelength.

Figure 5:
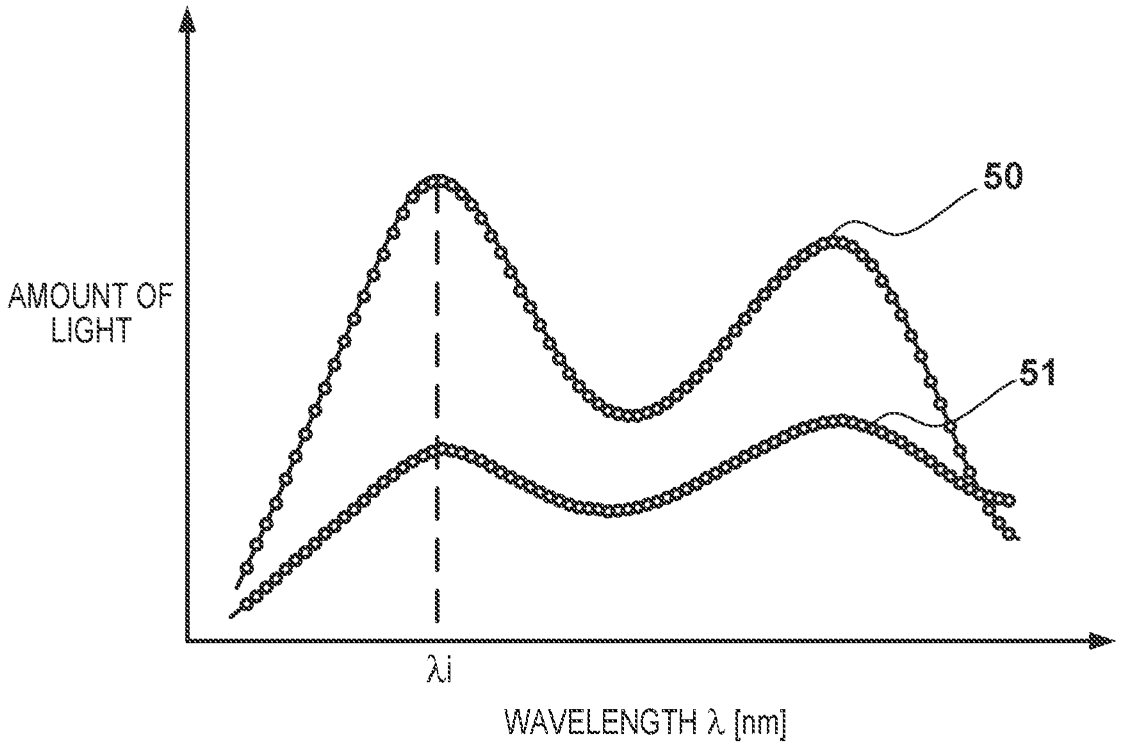
FIG. 5 illustrates spectral data.

The following describes a method for judging a border between patch images according to the present embodiment with reference to spectral data illustrated in FIG. 5. FIG. 5 illustrates spectral data acquired when patch images 50 and 51 are formed on the recording material 9 adjacent to each other. Note that the circles (○) in FIG. 5 represent the acquired spectral data. In the present invention, the wavelength λi which brings about the largest difference in the amounts of light beams is set as a wavelength of interest or a noticed wavelength, and a border between the patch images 50 and 51 is judged based on the noticed wavelength. More specifically, a threshold value is preset that is smaller than a difference between the amount of light from the patch image 50 and the amount of light from the patch image 51 at the noticed wavelength. When the amount of light at the noticed wavelength is changed significantly over the preset threshold, it is judged that the border has been crossed.

Figure 6:
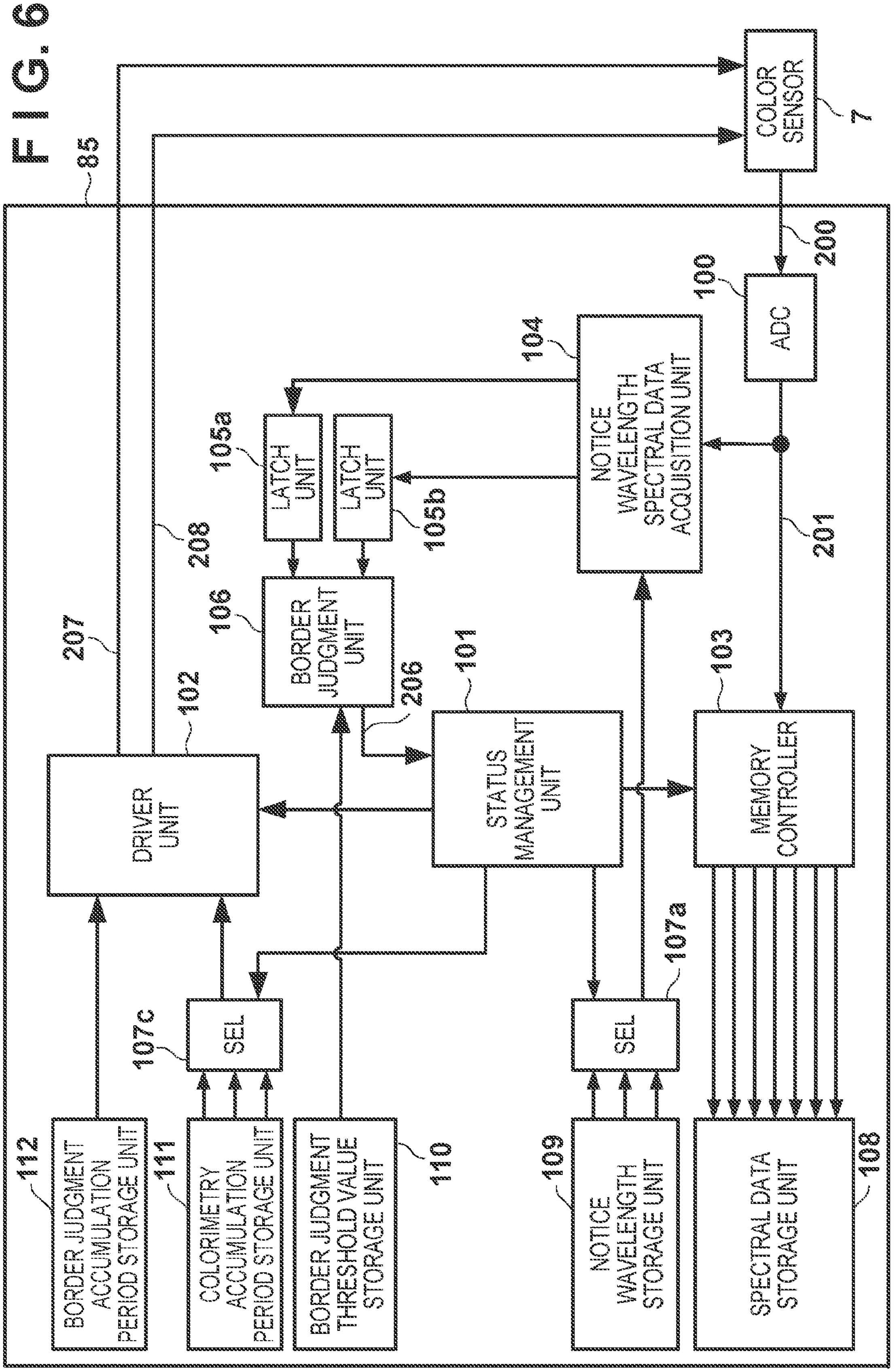
FIG. 6 is a block diagram showing a color sensor control unit according to one embodiment.

The following describes the details of the color sensor control unit 85 with reference to FIG. 6. In FIG. 6, an analog-to-digital converter (ADC) 100 converts analog spectral data 200 output from the color sensor 7 into digital spectral data 201. A notice wavelength spectral data acquisition unit 104 extracts, from the digital spectral data 201, spectral data at the noticed wavelength explained above with reference to FIG. 5, and outputs the extracted spectral data to a latch unit 105*a* or 105*b*. Note that the noticed wavelength is prestored in a notice wavelength storage unit 109. A border judgment unit 106 judges a border between patch images based on a difference between spectral data in the latch units 105*a* and 105*b* and on a border judgment threshold value whose data is stored in a border judgment threshold value storage unit 110. When judging that the border has been detected, the border judgment unit 106 outputs a border detection notification signal 206 to a status management unit 101. A memory controller 103 performs control to write digital spectral data 201 into a predetermined address in a spectral data storage unit 108.

Furthermore, in FIG. 6, a colorimetry accumulation period storage unit 111 stores data indicating a colorimetry accumulation period (first time period) for obtaining spectral data of each patch image required to detect a color value. Similarly, a border judgment accumulation period storage unit 112 stores data indicating a border judgment accumulation period (second time period) for obtaining spectral data required to judge a border between patch images. The status management unit 101 selects a noticed wavelength and a colorimetry accumulation period by controlling selectors 107*a* and 107*c* based on a patch image being detected by the color sensor 7. The status management unit 101 also manages storage of spectral data by controlling the memory controller 103 and operations of the color sensor 7 by controlling a driver unit 102. The driver unit 102 instructs the color sensor 7 to accumulate light reflected by patch images and to read spectral data.

Figure 7:
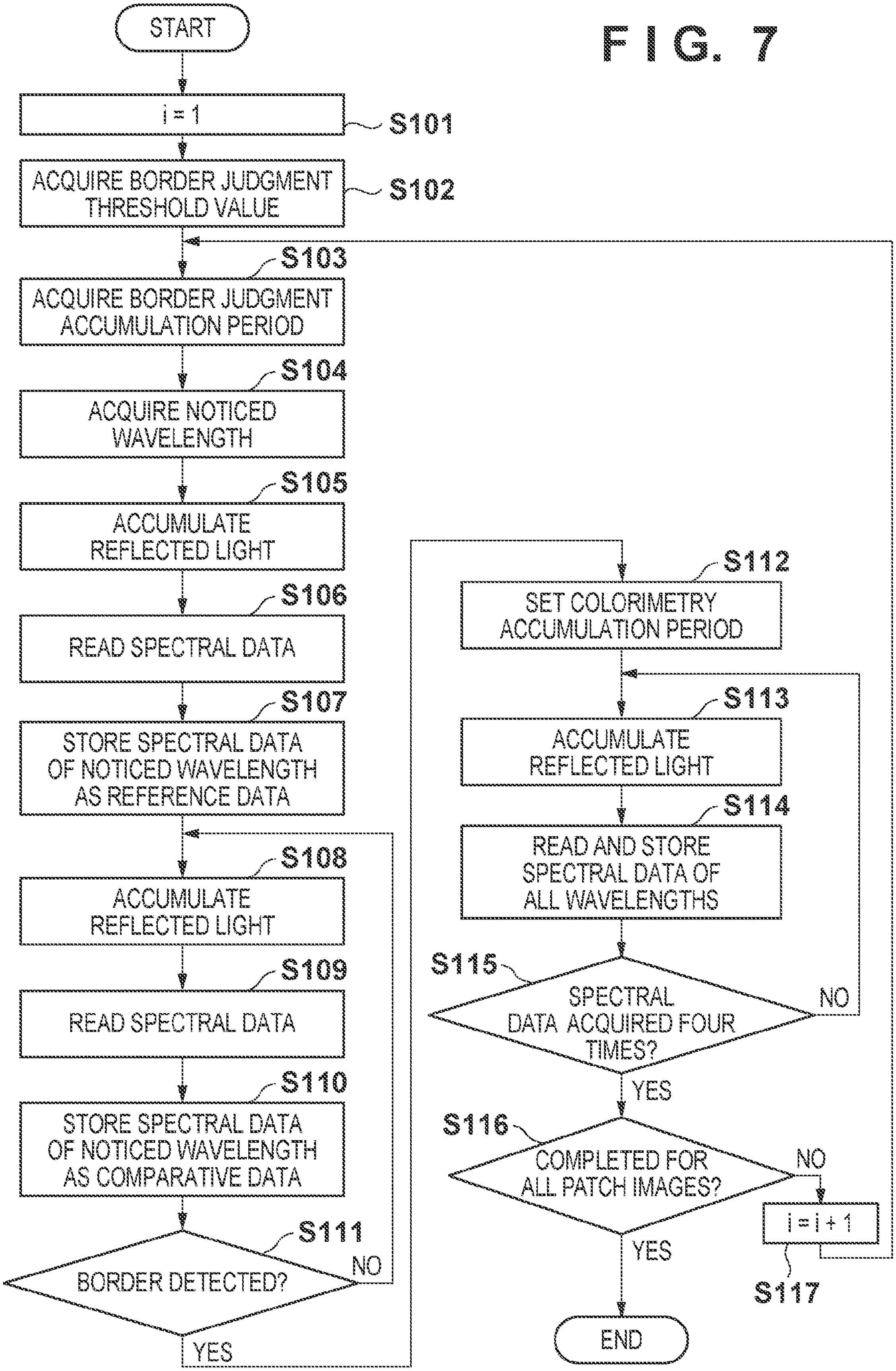
FIG. 7 is a flowchart of processing for updating a color conversion table according to one embodiment.

The following describes processing for generating or updating the color conversion table with reference to FIG. 7. Note that the processing of FIG. 7 is performed under control of the status management unit 101. Although FIG. 7 depicts a case where spectral data for detecting a color value is acquired four times from a single patch image, this number of times may be arbitrarily determined. The color sensor control unit 85 starts the processing of FIG. 7 after performing initial control, such as adjustment of an amount of light from the LED, acquisition of implied noise data, and acquisition of spectral data of the white reference plate 11. First, in S101, the status management unit 101 resets a counter i for patch images to zero. In S102, the border judgment unit 106 acquires data of a border judgment threshold value from the border judgment threshold value storage unit 110. In S103, the driver unit 102 acquires data of a border judgment accumulation period from the border judgment accumulation period storage unit 112. In S104, the notice wavelength spectral data acquisition unit 104 acquires, from the notice wavelength storage unit 109, data of a noticed wavelength for judging a border between first and second patch images.

In S105, the driver unit 102 transmits, to the color sensor 7, the accumulation instruction signal 207 including the border judgment accumulation period, for accumulating the reflected light. The color sensor 7 accumulates the reflected light in response to reception of the accumulation instruction signal 207. In S106, the driver unit 102 transmits, to the color sensor 7, the read instruction signal 208 for reading spectral data. The color sensor 7 outputs the acquired spectral data in response to reception of the read instruction signal 208. In S107, the notice wavelength spectral data acquisition unit 104 stores spectral data of the noticed wavelength into the latch unit 105*a* as reference data.

In S108, the driver unit 102 transmits, to the color sensor 7, the accumulation instruction signal 207 including the border judgment accumulation period, for accumulating the reflected light. The color sensor 7 accumulates the reflected light in response to reception of the accumulation instruction signal 207. In S109, the driver unit 102 transmits, to the color sensor 7, the read instruction signal 208 for reading spectral data. The color sensor 7 outputs the spectral data in response to reception of the read instruction signal 208. In S110, the notice wavelength spectral data acquisition unit 104 stores spectral data of the noticed wavelength into the latch unit 105*b* as comparative data.

In S111, the border judgment unit 106 judges a border between patch images on the basis of whether or not a difference between the reference data and the comparative data, which are respectively stored in the latch units 105*a* and 105*b*, is greater than the border judgment threshold value. More specifically, the border judgment unit 106 judges that the color sensor 7 is detecting the second patch image when an absolute value of the difference is greater than the threshold value, and judges that the color sensor 7 is still detecting the first patch image when the absolute value of the difference is smaller than the threshold value. When the absolute value of the difference is greater than the threshold value, the border judgment unit 106 transmits the border detection notification signal 206 to the status management unit 101. When the status management unit 101 has received the border detection notification signal 206, it judges that the border has been detected, i.e. the color sensor 7 has crossed the border between the patch images. On the other hand, when the status management unit 101 has not received the border detection notification signal 206, the processes of S108-S111 are repeated until the border is detected.

Upon reception of the border detection notification signal 206, the status management unit 101 transmits, to the driver unit 102, an acquisition instruction for acquiring spectral data for detecting a color value in S112. In response to the acquisition instruction, the driver unit 102 acquires data of a colorimetry accumulation period from the colorimetry accumulation period storage unit 111 via the selector 107*c*.

In S113, the driver unit 102 transmits, to the color sensor 7, the accumulation instruction signal 207 including the colorimetry accumulation period, for accumulating the reflected light. The color sensor 7 accumulates the reflected light in response to reception of the accumulation instruction signal 207. In S114, the driver unit 102 transmits, to the color sensor 7, the read instruction signal 208 for reading spectral data. The color sensor 7 outputs the acquired spectral data in response to reception of the read instruction signal 208. Furthermore, the memory controller 103 stores the spectral data into the spectral data storage unit 108. In S115, the status management unit 101 judges whether or not the spectral data for detecting a color value has been acquired four times. If the number of times the spectral data for detecting a color value has been acquired is smaller than four, then the processes of S113 and S114 are repeated until the number of times reaches four. When the number of times reaches four, the status management unit 101 judges in S116 whether or not spectral data of all patch images has been acquired. When the spectral data of all patch images has not been acquired yet, the status management unit 101 increments the counter i for patch images just by one in S117, and the processes are repeated from S103 onward.

Figure 8:
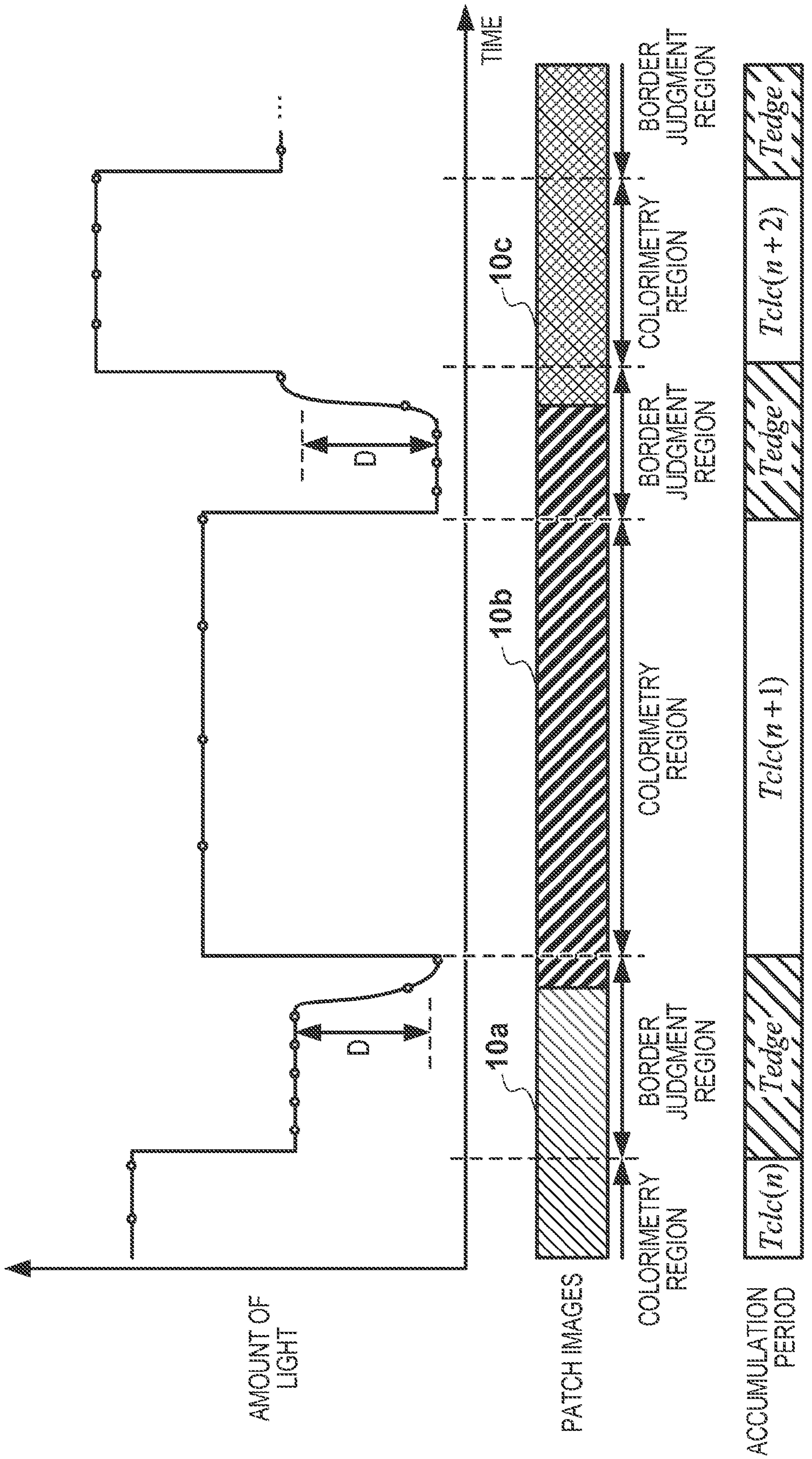
FIG. 8 shows a relationship between changes in spectral data and patch images according to one embodiment.

The following describes in more detail about acquisition of spectral data for judging a border between patch images and for detecting a color value in the present embodiment, with reference to FIG. 8. FIG. 8 shows an amount of light of the noticed wavelength. The circles on the waveform indicate timings for acquiring spectral data. Therefore, an interval between neighboring circles on the waveform represents a sampling interval for spectral data. D denotes a border judgment threshold value. Note that the patch images 10*a* and 10*c* have high reflectance, whereas the patch image 10*b* has low reflectance. As shown in FIG. 8, in a colorimetry region, i.e. a region in which spectral data for detecting a color value is acquired, the spectral data is acquired four times in succession in accordance with a colorimetry accumulation period set for the corresponding patch image (Tclc(n), Tclc(n+1), and Tclc(n+2) in FIG. 8). Specifically, the colorimetry accumulation periods for the patch images 10*a* and 10*c* with high reflectance are each set to be shorter than the colorimetry accumulation period for the patch image 10*b* with low reflectance. Once the acquisition of the spectral data for detecting a color value is completed, a border judgment process is commenced whereby a border between patch images is judged based on spectral data acquired by using a border judgment accumulation period (ledge in FIG. 8).

Note that in the present embodiment, a border judgment accumulation period in which a border between two patch images adjacent to each other is judged is set to be shorter than each of the colorimetry accumulation periods for the two patch images. Therefore, spectral data acquired in a border judgment region has smaller values than spectral data acquired in a colorimetry region. On the other hand, a time period necessary for a single acquisition of spectral data is shorter in a border judgment process than in a colorimetry process. Note that a border judgment accumulation period is determined (set) so that the value of spectral data of the noticed wavelength exceeds the preset threshold value to the extent that the border judgment can be performed.

Figure 9:
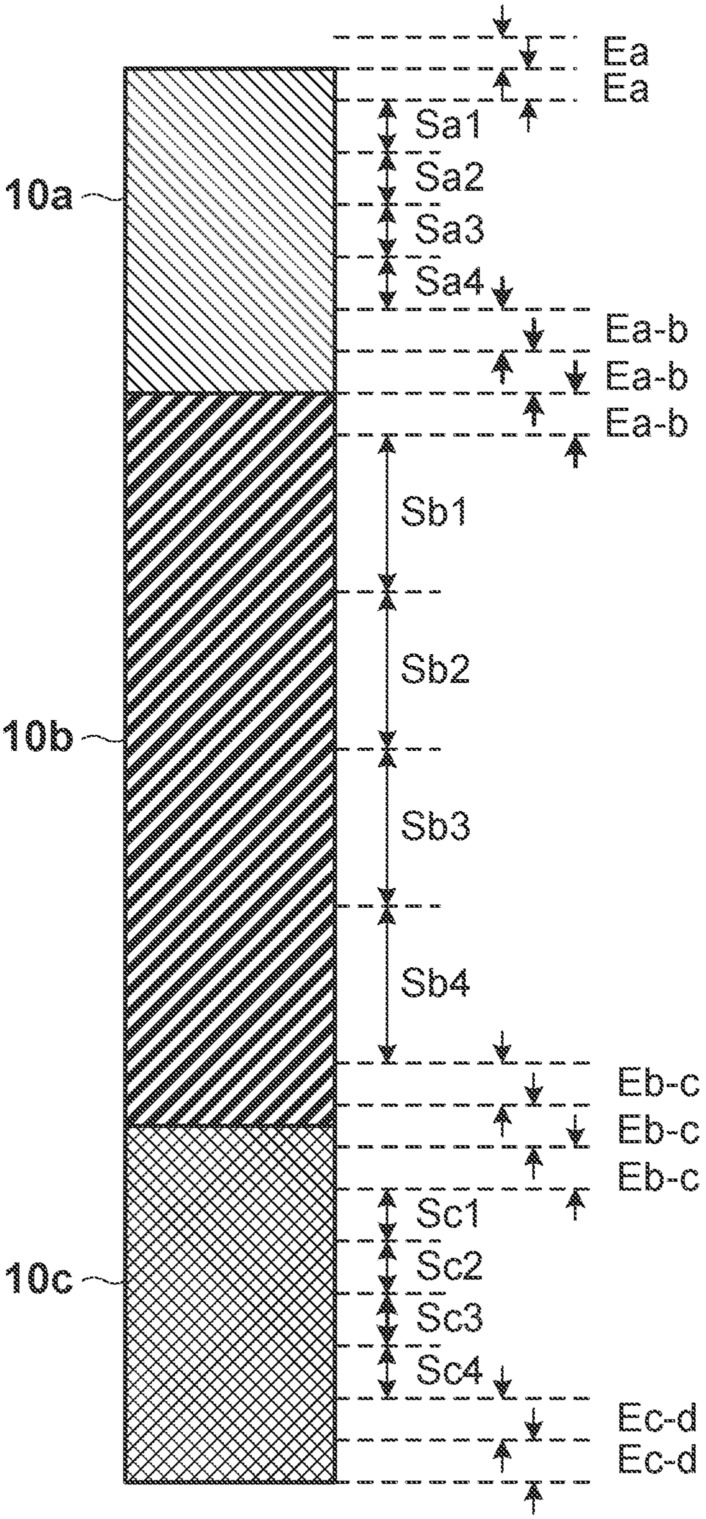
FIG. 9 illustrates patch images and timings for acquiring spectral data according to one embodiment.

The following describes patch images and timings for various controls according to the present embodiment with reference to FIG. 9. In FIG. 9, Ea, Ea-b, Eb-c, and Ec-d each represent a section necessary for acquiring spectral data for judging a border between patch images. Also, Sa1-Sa4, Sb1-Sb4, and Sc1-Sc4 each represent a section necessary for acquiring spectral data for detecting a color value of the corresponding patch image. As shown in FIG. 9, in the present embodiment, patch images are not distinguished from one another based on a time period that has elapsed since detection of the start of each patch image. Instead, a border between patch images is detected based on spectral data and the noticed wavelength. In addition, an accumulation period for acquiring spectral data for judging a border is set to be shorter than an accumulation period for acquiring spectral data for detecting a color value of each patch image defining that border. This configuration allows reducing the top and bottom margins required to judge a border between patch images, irrespective of differences in types of patch images, such as a patch image with high reflectance and a patch image with low reflectance. Furthermore, an accumulation period of the color sensor 7 for acquiring spectral data for detecting a color value of each patch image shortens as the reflectance of the patch image increases. This prevents an unnecessary increase in the length of patch images.

The following describes the effects of the present embodiment in comparison to prior art with reference to FIG. 10. Note that the speed of conveying the recording material is 200 mm/s (item 1), the top and bottom margins of the recording material are 5 mm each (items 3 and 4), and spectral data for detecting a color value of each patch image is acquired four times (item 6). In addition, color values are detected from fifty patch images with high reflectance (item 18) and eight patch images with low reflectance (item 19) as control on color balance correction. Furthermore, as comparison conditions, a tolerance on expansion and contraction of an image on a recording sheet caused by environmental changes affecting the image forming apparatus is set to 0.5% (item 5), and colorimetry accumulation periods for a patch image with high reflectance and a patch image with low reflectance are respectively set to 1.5 ms and 15.0 ms (items 7 and 8). Moreover, a border judgment accumulation period is set to 0.75 ms (items 9 and 10), and a time period for reading spectral data is set to 1.0 ms (item 11).

When the size of the recording material is A4 lengthwise in the direction of conveyance (item 2), the maximum variation in detection of each patch image is ±1.485 mm in view of the tolerance on expansion and contraction of the image on the recording material (item 5). Therefore, in prior art, it is required to set the top and bottom margins of patch images to at least 1.485 mm each. In contrast, in the present embodiment, the top and bottom margins required for a border judgment are 0.7 mm for each patch image regardless of its reflectance, in view of the border judgment accumulation period (items 9 and 10) and the time period for reading data (item 11). That is, the top and bottom margins of patch images have a smaller value in the present embodiment than in prior art.

The length required to form all patch images is determined based on the top and bottom margins (items 14-17), a range necessary for acquiring data for calculating a color value of each patch image (items 12 and 13), and the number of patch images (items 18 and 19). Specifically, this length is 374.66 mm in prior art and 283.6 mm in the present embodiment, as shown in FIG. 10 (item 20). Hence, with the top and bottom margins of the recording material (items 3 and 4), the required length of the recording material is 384.66 mm in prior art and 293.6 mm in the present embodiment. As opposed to prior art in which the patch images are formed on two recording materials, the present embodiment allows forming the patch images on one recording material.

As has been described above, in the present embodiment, a border between two patch images adjacent to each other is judged based on changes in spectral data of the noticed wavelength. In this way, the margin sections that precede and follow the border between patch images can be reduced compared to a case where the judgment is performed in terms of time. Furthermore, an accumulation period of the color sensor 7 is set to be shorter when acquiring spectral data for judging a border than when acquiring spectral data for calculating a color value. This configuration enables a further reduction in the margin sections that precede and follow a border between patch images, and thus allows providing the image forming apparatus that can perform color correction to a high degree of precision while reducing the number of recording materials used in control of color correction.

(Second Embodiment)

A description is now given of Second Embodiment of the present invention. As an image forming unit 1, a block diagram of an image forming apparatus, and a color sensor 7 according to the present embodiment are similar to those described in First Embodiment with reference to FIGS. 1-3, a description thereof is omitted.

Figure 11:
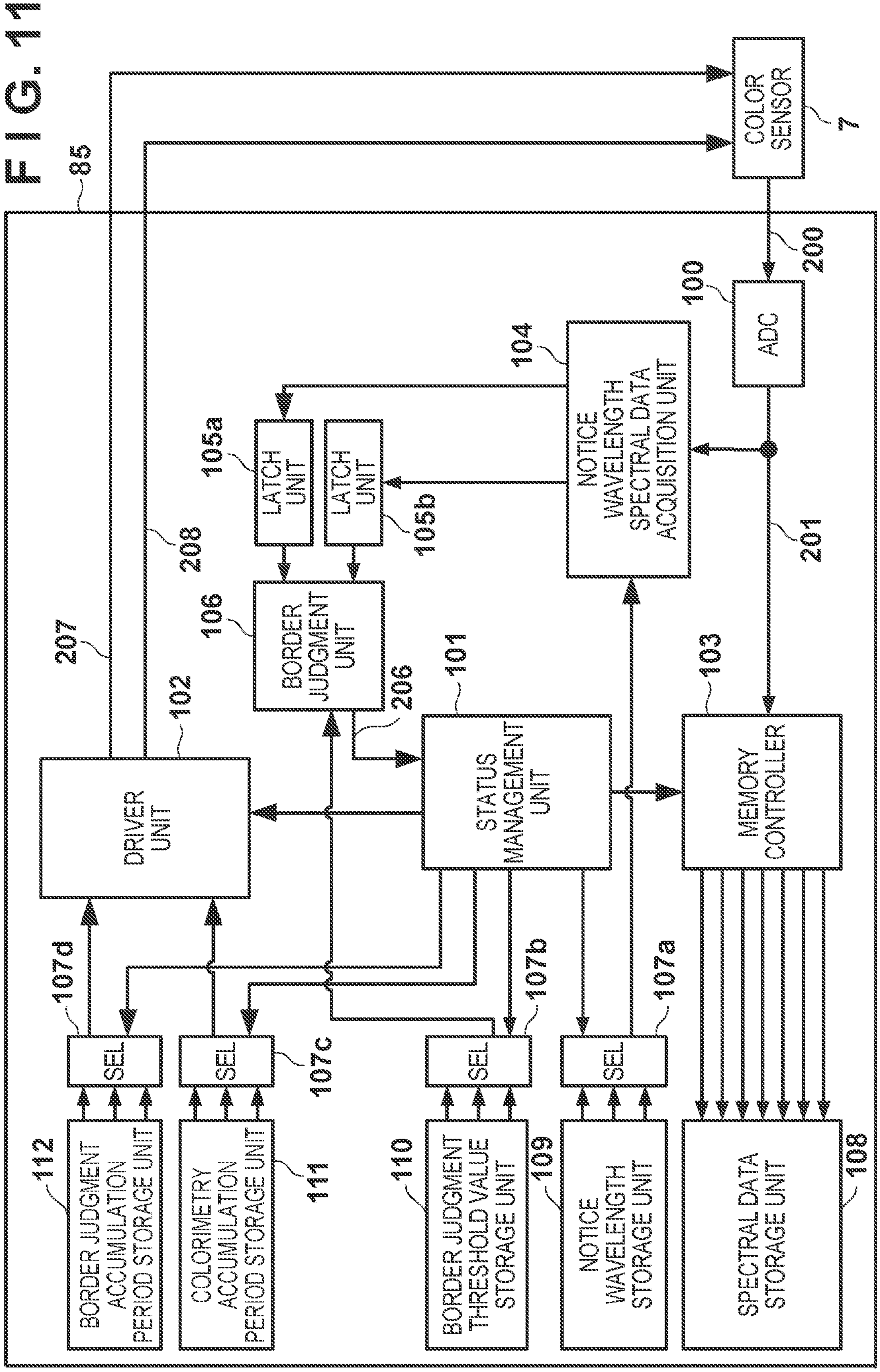
FIG. 11 is a block diagram showing a color sensor control unit according to one embodiment.

A color sensor control unit 85 according to the present embodiment will be described with reference to FIG. 11. In the block diagram of FIG. 11, constituent elements that are similar to constituent elements shown in FIG. 6 according to First Embodiment are given the same reference numerals as in FIG. 6, and a description thereof is omitted. The present embodiment differs from First Embodiment in that a border judgment threshold value storage unit 110 and a border judgment accumulation period storage unit 112 each store data indicating values corresponding to different borders each lying between two patch images adjacent to each other. Hence, selectors 107*b* and 107*d* are provided for selecting a threshold value and a border judgment accumulation period corresponding to each border between patch images. Note that the selectors 107*b* and 107*d* are also controlled by a status management unit 101. The border judgment accumulation period corresponding to each border is determined in accordance with the reflectance of two patch images defining that border. The amount of light necessary for the judgment can be acquired even when the accumulation period shortens as the reflectance increases. Therefore, the accumulation period is set to shorten as the reflectance of one of the two patch images defining the border increases.

Figure 12:
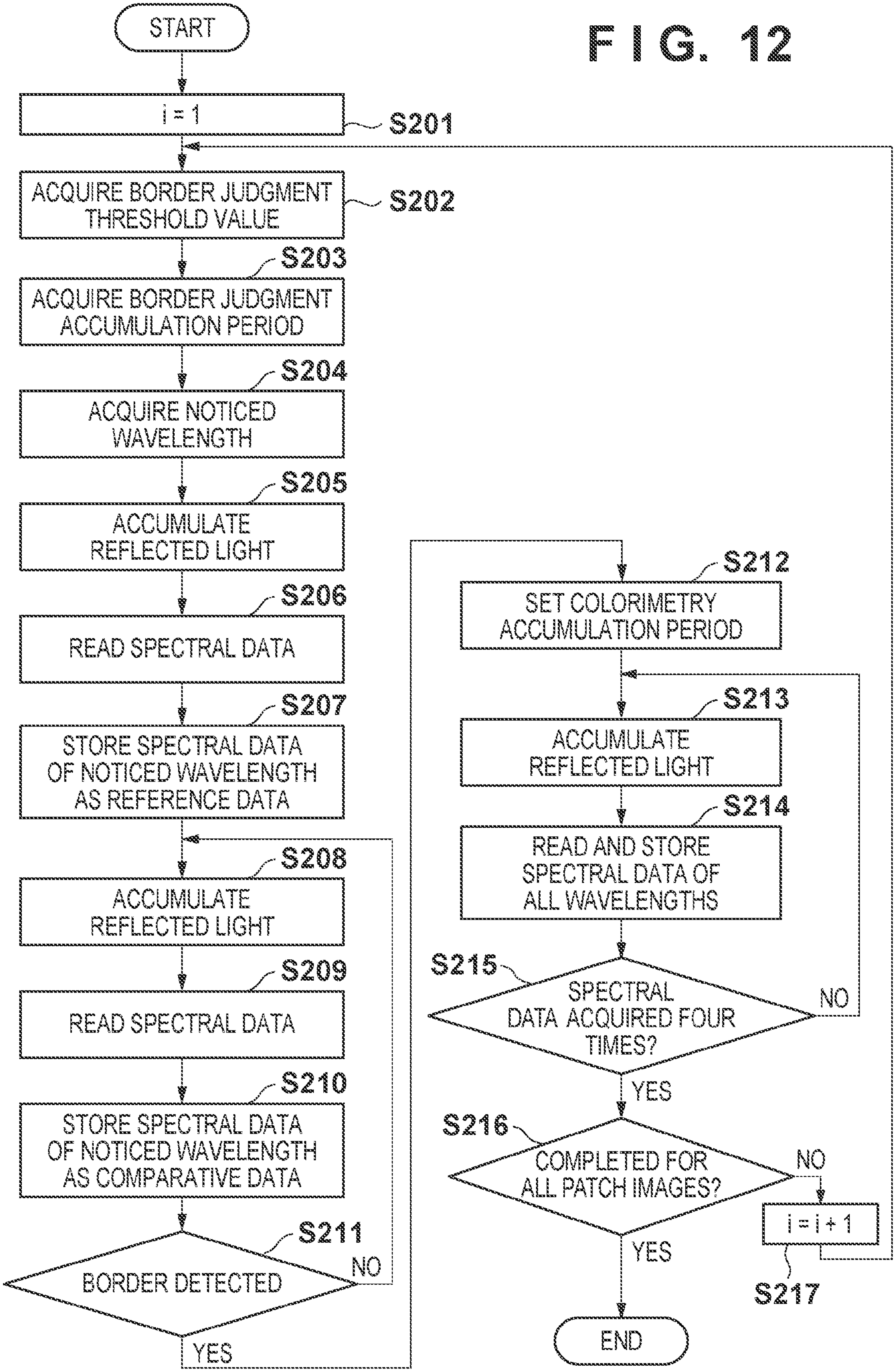
FIG. 12 is a flowchart of processing for updating a color conversion table according to one embodiment.

The following describes processing for generating or updating a color conversion table with reference to FIG. 12. Note that the processing of FIG. 12 is performed under control of the status management unit 101. The color sensor control unit 85 starts the processing of FIG. 12 after performing initial control, such as adjustment of an amount of light from a light-emitting diode (LED), acquisition of implied noise data, and acquisition of spectral data of a white reference plate 11. First, in S201, the status management unit 101 resets a counter i for patch images to zero. In S202, a border judgment unit 106 acquires, from the border judgment threshold value storage unit 110, data of a border judgment threshold value for judging a border between first and second patch images. In S203, a driver unit 102 acquires, from the border judgment accumulation period storage unit 112, data of a border judgment accumulation period for judging the border between the first and second patch images. As the processes from S204 onward are similar to the processes from S104 onward in FIG. 7, a description thereof is omitted. Note that the present embodiment differs from FIG. 7 in that when spectral data of all patch images has not been acquired yet as of the process of S216, the processes are repeated from S202 onward.

Figure 13:
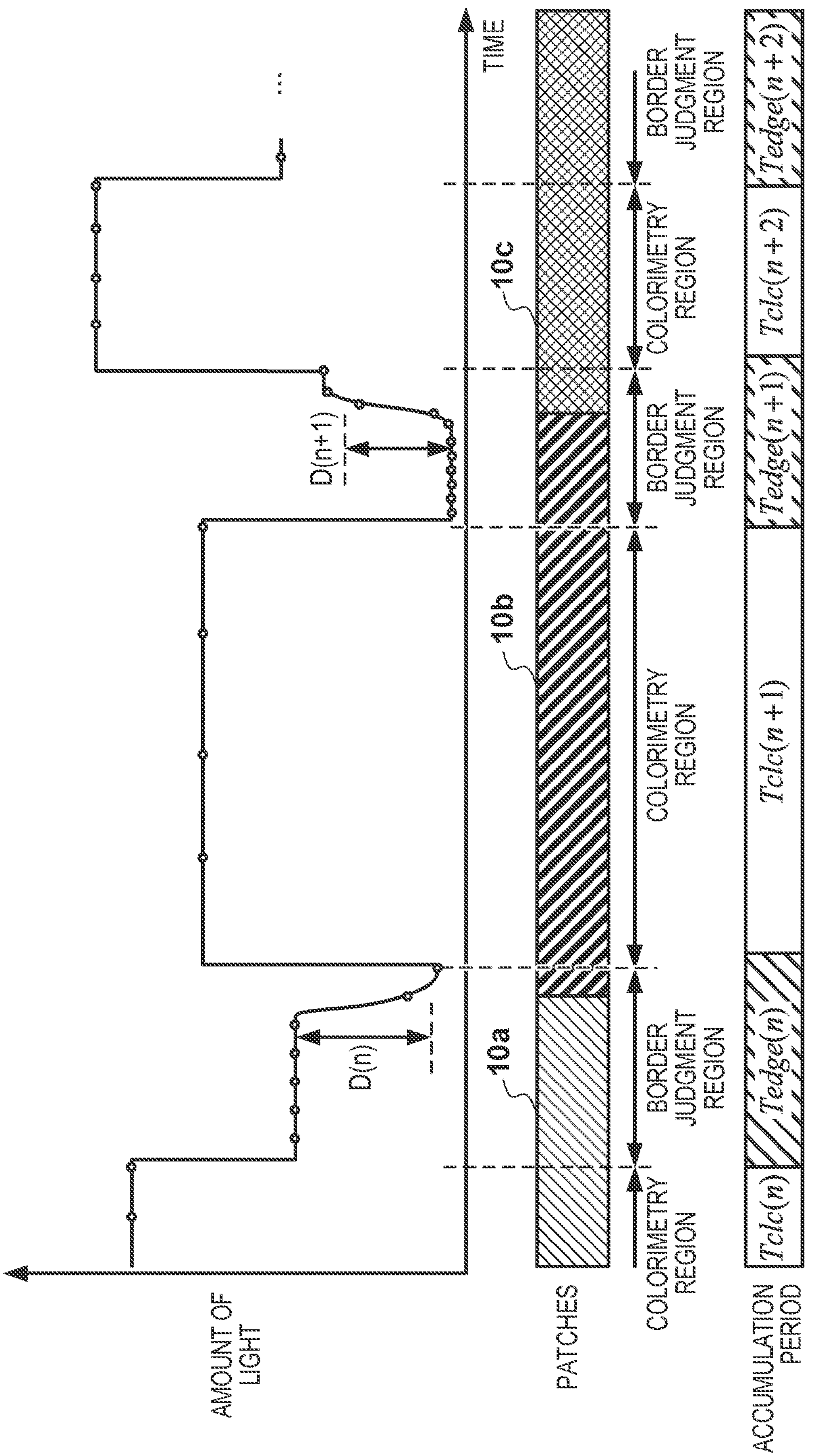
FIG. 13 shows a relationship between changes in spectral data and patch images according to one embodiment.

The following describes in more detail about acquisition of spectral data for judging a border between patch images and for detecting a color value in the present embodiment, with reference to FIG. 13. Note that the presentation of FIG. 13 and the reflectance of patch images 10*a*-10*c* of FIG. 13 are similar to those of FIG. 8. The present embodiment differs from First Embodiment depicted in FIG. 8 in that different accumulation periods (Tedge(n), Tedge(n+1), and Tedge(n+2) in FIG. 13) and different threshold values (D(n) and D(n+1) in FIG. 13) are set for different borders each lying between patch images. As the present embodiment allows setting the accumulation period of the color sensor 7 and the threshold value for judging a border between patch images on a per-border basis, a time period for acquiring spectral data for a border judgment can be reduced. As a result, a sampling period can be reduced as well. Hence, the length of patch images in the conveyance direction of the recording material can be made shorter in the present embodiment than in First Embodiment. This configuration allows providing the image forming apparatus that can perform color correction to a high degree of precision while reducing the number of recording materials used for the patch images.

(Third Embodiment)

Figure 14:
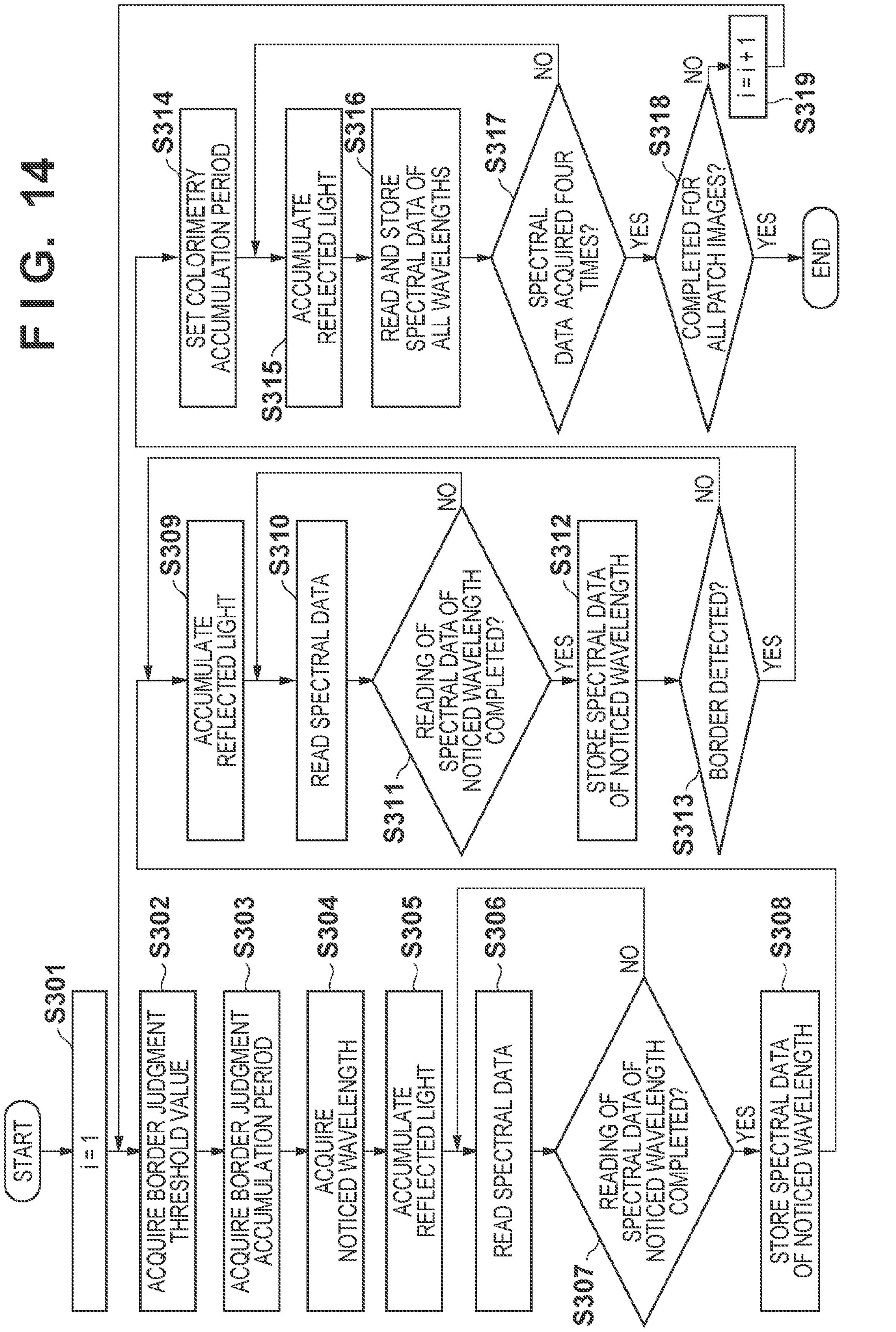
FIG. 14 is a flowchart of processing for updating a color conversion table according to one embodiment.

The following describes processing for generating or updating a color conversion table according to Third Embodiment of the present invention with reference to FIG. 14. As the constituent elements of an image forming apparatus according to the present embodiment are configured in a similar manner as in Second Embodiment, a description thereof is omitted. A color sensor control unit 85 starts the processing of FIG. 14 after performing initial control, such as adjustment of an amount of light from a light-emitting diode (LED), acquisition of implied noise data, and acquisition of spectral data of a white reference plate 11. As the processes of S301-S305 are similar to those of S201-S205 in FIG. 12, a description thereof is omitted.

In S306, a driver unit 102 transmits a read instruction signal 208 for reading spectral data to a color sensor 7. The color sensor 7 outputs the acquired spectral data in response to reception of the read instruction signal 208. In S307, a notice wavelength spectral data acquisition unit 104 monitors whether or not spectral data of the noticed wavelength has been acquired from the color sensor 7. When the notice wavelength spectral data acquisition unit 104 has acquired the piece of spectral data of the noticed wavelength, the driver unit 102 stops transmission of the read instruction signal 208 to the color sensor 7, i.e. stops the reading of spectral data from the color sensor 7. Thereafter, in S308, the noticed wavelength spectral data acquisition unit 104 stores the piece of spectral data of the noticed wavelength into a latch unit 105*a* as reference data.

In S309, the driver unit 102 transmits, to the color sensor 7, an accumulation instruction signal 207 including a border judgment accumulation period, for accumulating the reflected light. In S310, the driver unit 102 transmits the read instruction signal 208 for reading spectral data to the color sensor 7. The color sensor 7 outputs the acquired spectral data in response to reception of the read instruction signal 208. In S311, the notice wavelength spectral data acquisition unit 104 monitors whether or not spectral data of the noticed wavelength has been acquired from the color sensor 7. When the notice wavelength spectral data acquisition unit 104 has acquired the piece of spectral data of the noticed wavelength, the driver unit 102 stops transmission of the read instruction signal 208 to the color sensor 7, i.e. stops the output of spectral data from the color sensor 7. Thereafter, in S312, the notice wavelength spectral data acquisition unit 104 stores the piece of spectral data of the noticed wavelength into a latch unit 105*b* as comparative data.

In S313, a border judgment unit 106 judges a border between patch images on the basis of whether or not a difference between the reference data and the comparative data, which are respectively stored in the latch units 105*a* and 105*b*, is greater than a border judgment threshold value. More specifically, the border judgment unit 106 judges that the color sensor 7 is detecting the second patch image when an absolute value of the difference is greater than the threshold value, and judges that the color sensor 7 is still detecting the first patch image when the absolute value of the difference is smaller than the threshold value. When the absolute value of the difference is greater than the threshold value, the border judgment unit 106 transmits a border detection notification signal 206 to a status management unit 101. When the status management unit 101 has received the border detection notification signal 206, it judges that the border has been detected. On the other hand, when the status management unit 101 has not received the border detection notification signal 206, it judges that the border has not been detected yet, and the processes of S309-S313 are repeated until the border is detected. As the processes of S314-S319 following the detection of the border are similar to those of S212-S217 in FIG. 12, a description thereof is omitted.

Figure 15:
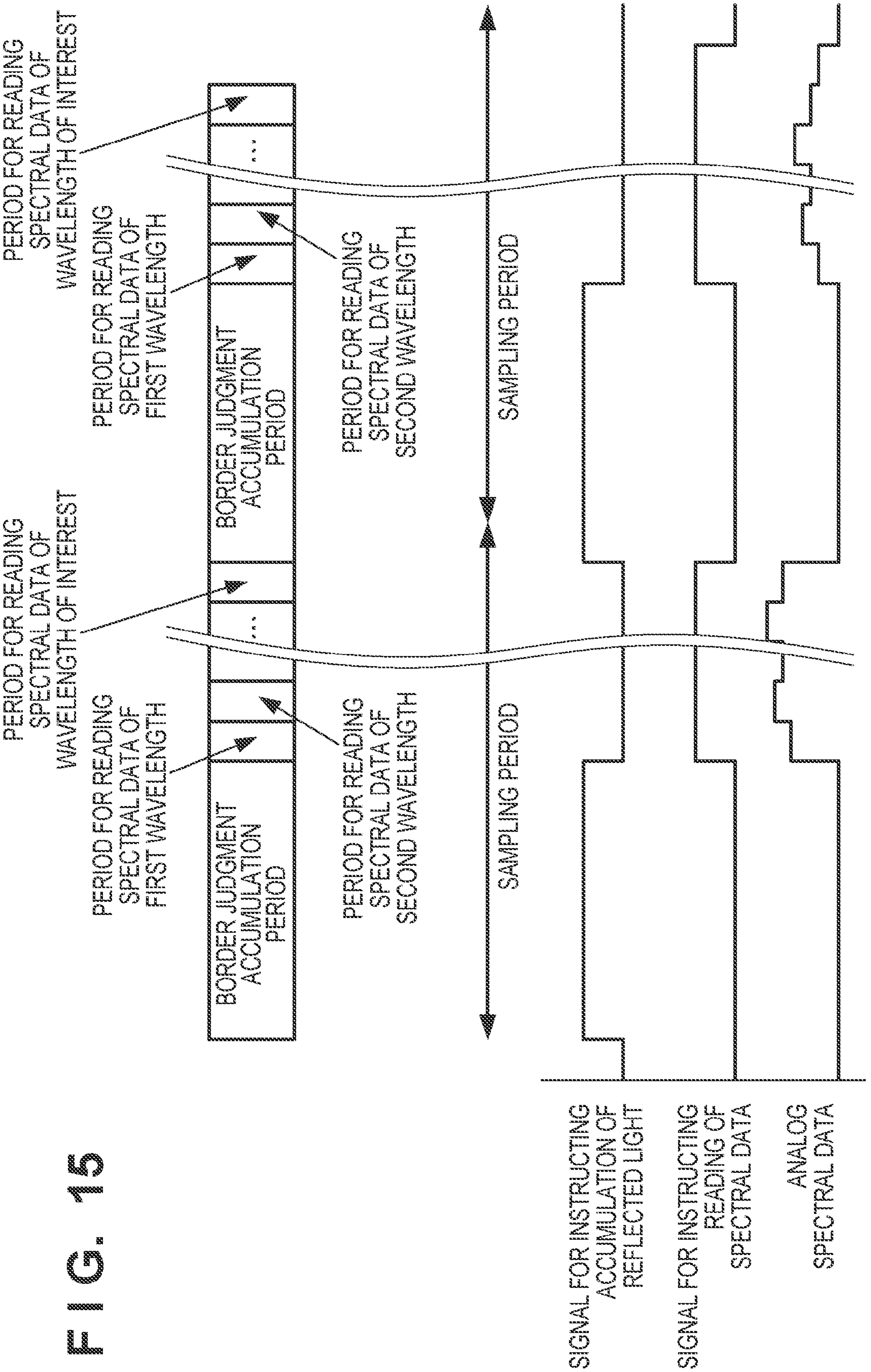
FIG. 15 is a timing chart illustrating control on a color sensor according to one embodiment.
Figure 16:
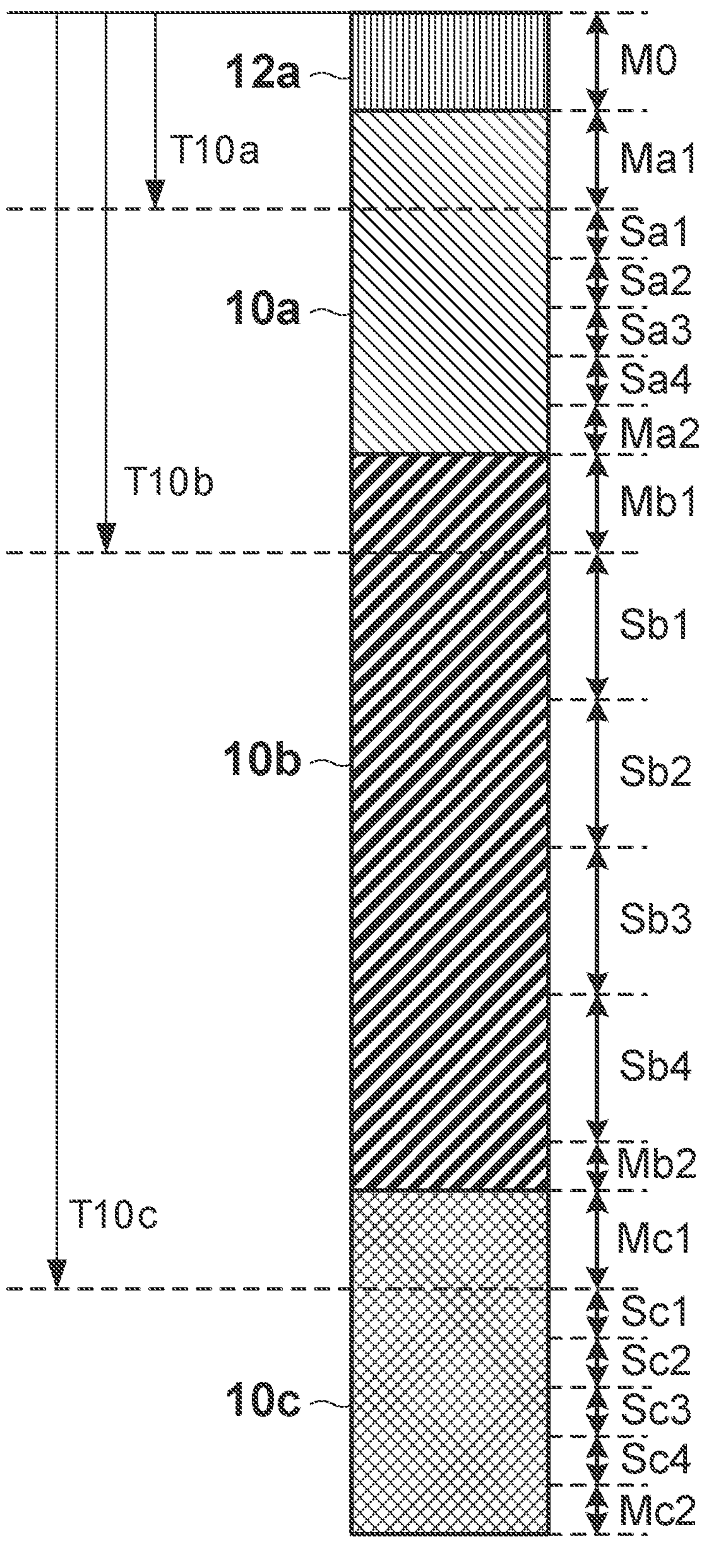
FIG. 16 illustrates patch images and timings for acquiring spectral data.

As shown in a timing chart of FIG. 15, in the present embodiment, the reading of spectral data from the color sensor 7 is stopped once spectral data of the noticed wavelength is acquired. This can reduce a sampling period necessary for a single acquisition of spectral data in border judgment. As a result, the length of patch images in the conveyance direction of the recording material can be further reduced. This configuration allows providing the image forming apparatus that can perform color correction to a high degree of precision while reducing the number of recording materials used for the patch images.

In addition, the color sensor control unit 85 may be configured to have the color sensor 7 (spectral data detection unit) accumulate and output only the spectral data of the noticed wavelength in border judgment. That is to say, it is possible to have a configuration where, in border judgment, only the spectral data of the noticed wavelength is input to the color sensor control unit 85, and the border judgment unit 106 judges only changes in data indicating the amount of light at the noticed wavelength. This enables a further reduction in a sampling period necessary for a single acquisition of spectral data in border judgment.

Although it has been described in the above embodiments that spectral data for detecting a color value is acquired four times, this number of times may be arbitrarily determined. Furthermore, although it has been described above that a border between patch images is judged based on one noticed wavelength, the border may be judged based on a plurality of wavelengths. When thus using a plurality of wavelengths, threshold values are set in one-to-one correspondence with the plurality of wavelengths. In this case, it is judged that the border has been detected when changes for a predetermined number of wavelengths exceed the corresponding threshold values. Furthermore, in the above description, a border between patch images is detected on the condition that a value of a change in spectral data of the noticed wavelength exceeds the threshold value even once. Alternatively, the border may be detected on the condition that the value of the change exceeds the threshold value multiple times.

It has been described in the above embodiments that the color sensor 7 includes the diffraction grating that disperses light. Alternatively, it is possible to have a configuration in which the light is dispersed by a plurality of filters that transmit light at different wavelength bands, or by a prism. Furthermore, in the above description, a light-emitting diode (LED) is used as a light-emitting device in the color sensor 7. However, the light-emitting device is not limited to the LED. Alternatively, it is possible to have a configuration in which an organic electroluminescence device (organic EL device), an electrochemiluminescence device (ECL device), or the like is used. It has also been described in the above embodiments that patch images are arranged such that there is no space between any two neighboring patch images in the conveyance direction of the recording material. Alternatively, a minute space or a minute image having a different coloration from patch images may be provided between any two neighboring patch images.

Furthermore, it has been described in the above embodiments that data of the noticed wavelength and data of the threshold value are predetermined and prestored in the notice wavelength storage unit 109 and the border judgment threshold value storage unit 110, respectively. Alternatively, it is possible to have a configuration in which the data of the noticed wavelength and the data of the threshold value are updated based on spectral data of each patch image acquired during processing for correcting or updating the color conversion table.

As has been described above, in the present invention, an accumulation period of the color sensor 7 is shorter when judging a border than when detecting color values of two patch images that precede and follow the border. As a result, two margin sections that precede and follow the border between patch images can be reduced. This configuration allows reducing the size of patch images while maintaining favorable detection accuracy.

It should be noted that the length of patch images in the conveyance direction can be further reduced by changing the accumulation period of the color sensor 7 when acquiring spectral data for judging a border between patch images on a per-border basis. Specifically, this can be done by making the accumulation period shorter as the reflectance of patch images that precede and follow a border to be detected increases. Furthermore, the length of patch images in the conveyance direction can be further reduced by changing the accumulation period of the color sensor 7 when acquiring spectral data for calculating a color value depending on, for instance, the reflectance or the like of the patch image targeted for calculation of the color value. Moreover, the length of patch images in the conveyance direction can be further reduced by stopping the reading of spectral data from the color sensor 7 once data indicating an amount of light at the noticed wavelength is acquired from the color sensor 7 in border judgment.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-139857, filed on Jun. 23, 2011, which is hereby incorporated by reference herein in its entirety.

What is claimed is:

1. An image forming apparatus comprising:

an image forming unit constructed to form a plurality of patch images on a recording material;

a spectral data detection unit constructed to irradiate the recording material with light, photoelectrically convert light of a first number of wavelengths included in the reflected light, and detect an amount of the light of the first number of wavelengths;

a border judgment unit constructed to judge a border between two patch images adjacent to each other among the plurality of patch images formed on the recording material, based on change in the amount of the light of a second number of noticed wavelengths detected by the spectral data detection unit, wherein the second number is one or more, and less than the first number;

a color value calculation unit constructed to calculate a color value of a patch image from the amount of the light of the first number of wavelengths detected by the spectral data detection unit irradiating the patch image with the light; and a control unit constructed to control an accumulation period of charge for the photoelectric conversion at the spectral data detection unit, wherein the control unit is further constructed to make the accumulation period of the spectral data detection unit shorter when judging the border between the two patch images adjacent to each other than when calculating the color value of each of the two patch images.

2. The image forming apparatus of claim 1, wherein the accumulation period of the spectral data detection unit when the border judgment unit judges the border is determined such that the amount of the light of the noticed wavelengths detected by the spectral data detection unit exceeds a predetermined threshold value.

3. The image forming apparatus of claim 1, wherein the accumulation period of the spectral data detection unit when the color value calculation unit calculates the color value is set individually for each of the plurality of patch images.

4. The image forming apparatus of claim 3, wherein the accumulation period of the spectral data detection unit when the color value calculation unit calculates the color value shortens as reflectance of a patch image that is targeted for calculation of the color value increases.

5. The image forming apparatus of claim 1, wherein the accumulation period of the spectral data detection unit when the border judgment unit judges the border is set individually for each of a plurality of borders, each border lying between two patch images adjacent to each other among the plurality of patch images.

6. The image forming apparatus of claim 5, wherein the accumulation period of the spectral data detection unit when the border judgment unit judges the border shortens as reflectance of two patch images that precede and follow the border targeted for detection increases.

7. The image forming apparatus of claim 1, wherein the control unit is further constructed to control to stop the spectral data detection unit from outputting data indicating the amounts of light of wavelengths other than data indicating the amount of light of the noticed wavelengths, if the border judgment unit judges that the spectral data detection unit detects the amount of light of the noticed wavelengths.

8. The image forming apparatus of claim 1, wherein the control unit is further constructed to, when the border judgment unit judges the border, control the spectral data detection unit to output only the amount of the light beam of the noticed wavelengths.

9. The image forming apparatus of claim 1, further comprising:

a fixing unit constructed to fix an image formed on a paper corresponding to the recording material, wherein the patch image is detected by the spectral data detection unit after fixing the patch image formed on the paper by the fixing unit and before discharging the paper from the image forming apparatus.

10. An image forming apparatus comprising:

an image forming unit constructed to form a plurality of patch images on a recording material for detecting color values; and a spectral data detection unit constructed to irradiate the recording material with light, photoelectrically convert light of a first number of wavelengths included in the reflected light, and detect an amount of the light of the first number of wavelengths;

wherein an accumulation period of a second number of wavelengths, where the second number is one or more, and less than the first number, at the spectral data detection unit when judging a border between two patch images adjacent to each other among the plurality of patch images is shorter than an accumulation period of the first number of wavelengths at the spectral data detection unit when detecting the color values of the plurality of patch images.

11. The image forming apparatus of claim 10, further comprising:

a fixing unit constructed to fix an image formed on a paper corresponding to the recording material, wherein the patch image is detected by the spectral data detection unit after fixing the patch image formed on the paper by the fixing unit and before discharging the paper from the image forming apparatus.

12. An detection apparatus comprising:

a spectral data detection unit constructed to irradiate a recording material with light, photoelectrically convert light of a first number of wavelengths included in the reflected light, and detect an amount of the light of the first number of wavelengths;

a border judgment unit constructed to judge a border between two patch images adjacent to each other among a plurality of patch images formed on the recording material, based on change in the amount of the light of a second number of noticed wavelengths detected by the spectral data detection unit, wherein the second number is one or more, and less than the first number;

a color value calculation unit constructed to calculate a color value of a patch image from the amount of the light of the first number of wavelengths detected by the spectral data detection unit irradiating the patch image with the light; and a control unit constructed to control an accumulation period of charge for the photoelectric conversion at the spectral data detection unit, wherein the control unit is further constructed to make the accumulation period of the spectral data detection unit shorter when judging the border between the two patch images adjacent to each other than when calculating the color value of each of the two patch images.

13. A detection apparatus comprising:

a spectral data detection unit constructed to irradiate a recording material with light, photoelectrically convert light of a first number of wavelengths included in the reflected light, and detect an amount of the light of the first number of wavelengths;

wherein an accumulation period of a second number of wavelengths, where the second number is one or more, and less than the first number, at the spectral data detection unit when judging a border between two patch images adjacent to each other among a plurality of patch images formed on the recording material is shorter than an accumulation period of the first number of wavelengths at the spectral data detection unit when detecting color values of the plurality of patch images.

* * * * *